March 14, 1967  G. K. WEBER  3,309,185

METHOD FOR MAKING FILAMENTOUS MATS

Filed Sept. 10, 1962  2 Sheets-Sheet 1

INVENTOR.
GEORGE K. WEBER

BY Edward C. Greay

ATTORNEY

March 14, 1967  G. K. WEBER  3,309,185
METHOD FOR MAKING FILAMENTOUS MATS
Filed Sept. 10, 1962  2 Sheets-Sheet 2

0 OSC.
0 ROT.

¼ OSC.
½ ROT.

½ OSC.
1 ROT.

¾ OSC.
1½ ROT.

FRONT

SIDE

1 OSC.
2 ROT.

AXIAL LENGTH ON DRUM
(MAT WIDTH)

INVENTOR.
GEORGE K. WEBER
BY
*Edward C. Grey*
ATTORNEY

United States Patent Office 3,309,185
Patented Mar. 14, 1967

3,309,185
METHOD FOR MAKING FILAMENTOUS MATS
George K. Weber, Louisville, Ky., assignor to American Air Filter Company, Inc., Louisville, Ky., a corporation of Delaware
Filed Sept. 10, 1962, Ser. No. 222,403
6 Claims. (Cl. 65—2)

This invention relates to filamentous mats and the way in which they are made.

Filamentous mats produced according to the invention are useful, in their presently preferred flat form, as reinforcing mats in molded and in laminated plastic materials. Among the desirable characteristics which may be produced in the mats according to the invention are high density, substantial multi-directional strength in the plane of the mat relative to its weight, substantial integrity in the direction of depth, and the ability to be produced relatively inexpensively as compared to conventional mats suitable for the same purposes.

In carrying out the invention in one way, one or more filaments are wound upon an element which rotates upon its longitudinal axis while the element simultaneously is being oscillated or wobbled about an axis intersecting the longitudinal axis of the element at an acute angle at the center or midpoint thereof. The oscillating movement of the element may be viewed in another way as orbiting the ends of the element around an axis which intersects the element axis at an acute angle at the center of the element axis so that the longitudinal axis of the element generates a pair of axially aligned opposite right circular cones disposed with their vertexes touching at the center of the element longitudinal axis. The compact filamentous mat formed on the element after a number of rotations and oscillating revolutions is removed therefrom by slitting the mat along a line parallel to the element axis, unwrapping the slit mat from the element and laying it out flat, or in what may be considered as developed form, to form a rectangular planar compact mat.

This mat, in accordance with the presently preferred practice of the invention, comprises a series of flat overlying layers of crossing filaments, with substantially all of the filaments extending between the lateral edges of the mat corresponding to the cutting line, and with the filaments tracing at least a portion of a generally elliptic sine curve which has a total amplitude equal to the lateral dimension of the mat. Within the layer, about half of the intersections between the diagonally crossing filaments are formed with the filaments extending generally one way overlying the filaments extending generally the other way, and with the remaining intersections having the reverse relationship.

Features of the mat and characteristics of various patterns which the mat may incorporate will be further considered in the following description which is to be taken in connection with the accompanying drawing wherein.

Figure 1:
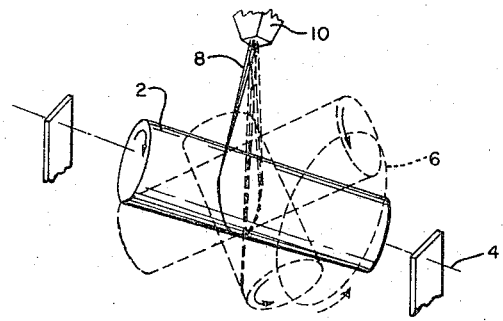
FIGURE 1 is a largely schematic perspective view generally illustrating the movement of the element upon which the filaments are wound relative to the furnace from which the filaments issue.

Drum movement generally (FIG. 1)

The general character of movement involved when the rotating and oscillating element is a right cylinder or drum 2 is depicted in FIGURE 1. There the drum is shown in three successive positions, approximately 120° removed from each other, during an oscillating revolution about a horizontal axis 4 which intersects the drum longitudinal axis at an angle of about 45° at the center of the drum. The direction of rotation of the drum about its longitudinal axis is indicated by the solid line arrows on the ends of the drum. The direction of drum oscillation is the same and is indicated by the broken line arrow adjacent the broken line orbit 6 tracing the path of the right end of the drum about the axis 4. As the drum both rotates and oscillates, glass fiber filaments 8 issuing from a supply of molten glass in furnace 10 are drawn by and wound upon the drum in successive turns which ultimately form a cylindrical compact mat which is cut along an axial line and unwrapped from the drum to form a planar mat. The axial length of the drum relative to its diameter is exaggerated in FIG. 1 for increasing clarity.

Figures 2, 3:
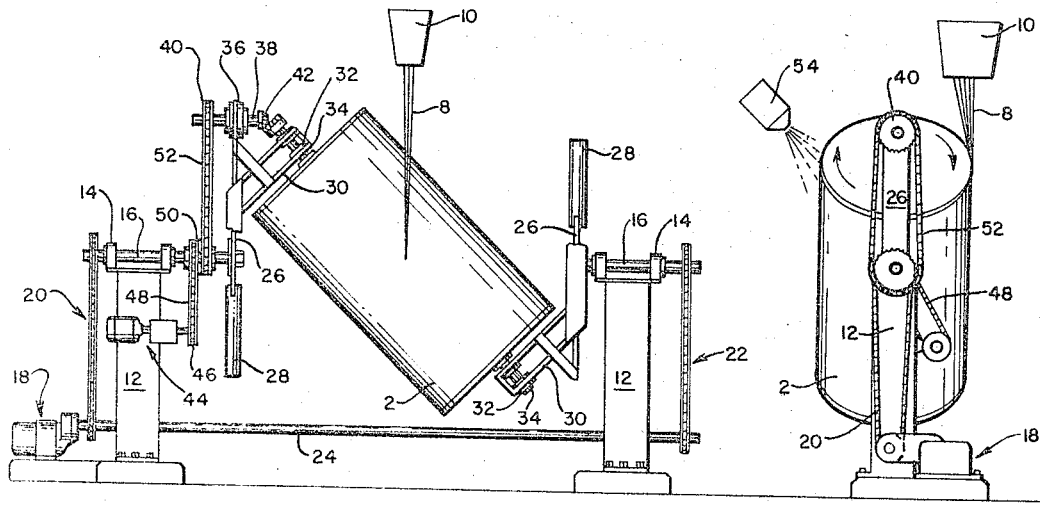
FIGURE 2 is a front view of apparatus for carrying out the invention.
FIGURE 3 is an end view of the apparatus of FIGURE 2.

Apparatus (FIGS. 2 and 3)

Before going into the somewhat complex matters relating to patterns and variations in mats attainable in practicing the method, one example of presently preferred apparatus used to make the mat will be described in connection with FIGURES 2 and 3. The drum 2 is carried between a pair of spaced apart pedestals 12 which are securely anchored to the floor and which have bearings 14 mounted on their upper ends to carry a pair of opposite and aligned shafts 16. Both of the shafts 16 are rotated together by an electric motor and gear reducer assembly 18 which drives left shaft 16 through one sheave-belt arrangement generally designated 20, and drives the right shaft 16 through another sheave-belt arrangement generally designated 22. The right sheave-belt arrangement 22 is driven through a long shaft 24 journalled in bearings carried by the lower portion of the pedestals.

The drum 2 is disposed between the two pedestals 12 with the drum longitudinal axis being intersected at its center by the axis of the aligned shafts 16. The means which supports the drum between the pedestals and makes the driving connection between the shafts 16 and the respective ends of the drum for moving the drum in oscillating fashion includes certain corresponding members which are herein identified by the same numerals. These members include the oppositely directed arms 26 which are rigidly secured to the inner ends of the shafts 16 for rotation therewith in a vertical plane, the counter weights 28 carried on one end of the arms 26, the open frame connecting members 30 connected at one end to the arms 26 and extending inwardly from the arms at an angle such that they parallel the ends of the drum and each other, and several bracing members as illustrated which impart rigidity and strength to the connecting assemblies as a whole. Both of the open frames 30 carry bearings 32 which receive the projecting axles 34 of the drum 2. With the arrangement thus far described, the drum can be driven in the oscillating motion.

For rotating the drum about its axis, it is preferred that independent drive means be provided so that the speed ratios of drum rotation to drum oscillation can be changed easily. The mechanism included in such independent drive means will now be described. The left arm 26 has a bearing 36 on its end opposite the counter-weight, and this bearing holds a shaft 38 carrying a sprocket 40 on one end and a bevel gear 42 on the other end. The gear 42 meshes with another bevel gear also designated 42 fixed on the drum axle 34. A separate electric motor and gear reducer assembly 44 mounted on the left pedestal 12 is the source of rotating power for the drum, and is connected to drive sprocket 40 through reducer sprocket 46, chain 48, double sprocket 50 mounted on the left shaft 16 and freely rotatable independently of the shaft, and chain 52. The gear reducer is of the type which may be adjusted to vary its output speed.

The furnace 10 is positioned, as viewed from in front, centrally above the drum with the rows of orifices in its bottom wall through which filaments 8 descend parallel to and generally centered on the vertical plane which is perpendicular to the oscillating axis 4 and intersects the center point of the drum. As shown in FIGURE 3, its position as viewed from the side of the apparatus is offset from a vertical plane coinciding with the oscillating axis 4 so that with the arms 26 in vertical positions, the orifices are substantially directly above that part of the down-turning surface of the drum which would be tangent to a vertical plane. The exact position of the furnace with respect to being on one side or the other of the vertical plane coinciding with oscillating axis 4 is not critical since the oscillating path of the drum is the same as viewed from any position in a plane perpendicular to the oscillating axis and intersecting the center of the drum, and the filaments 8 will take a path which is tangential to the drum surface receiving the filaments. However, since presently preferred practice is to feed filaments directly from the furnace to the drum without any intermediate guiding or gathering means, and since from the standpoint of minimizing fiber breakout it is best to pull the fibers straight out of the furnace, a position generally corresponding to FIGURE 3 is preferred.

Under certain conditions it is desirable that a resin be applied to the mat as it is being formed on the drum. Thus a suitable applicator such as one or more nozzles 54 is provided for spraying the resin on the mat during formation. It is usually desirable to apply resin to at least the initial turns which form a complete layer to insure retention of the filaments on the drum surface (which is usually covered with a sheet of paper) in their deposited position.

It is believed that the apparatus for developing the motion depicted in FIGURE 1 will now be generally understood from the preceding description. The apparatus is capable of oscillating and rotating the drum at various speeds and ratios in accordance with desired mat characteristics and patterns. Such matters will now be considered.

*Drum positions during winding (FIGS. 4–13)*

FIGURES 4–13 illustrate by way of front and corresponding side views of the drum, successive stages of winding one filament, or a number of filaments in one group, during a period in which the drum rotates twice and passes through one oscillating cycle. To promote clarity in further description, this term cycle will only be used in connection with an oscillation, and all ratios will be based upon a single oscillating cycle. The direction of oscillation is shown by arrows adjacent the drum in the side views, while the direction of rotation of the drum on its axis is shown by the arrows on the ends of the drum.

Figure 4:
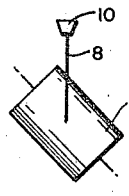
FIGURES 4-13 illustrate stages of winding a filament upon a drum shown in successive positions as viewed from the front and the side during a full oscillating cycle, and with the drum rotating on its axis twice during the cycle.
Figure 5:
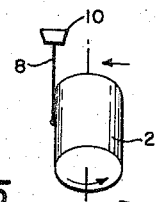
Figure 6:
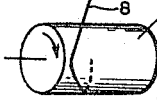
Figure 7:
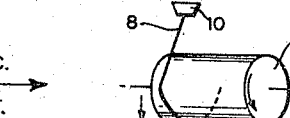
Figure 8:
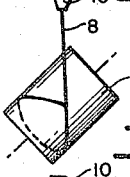
Figure 9:
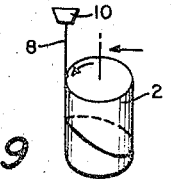
Figure 10:
Figure 11:
Figure 12:
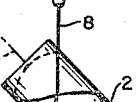
Figure 13:

The drum 2 in FIGURES 4 and 5 is shown at a time during the cycle when the filament 8 is being wound through the center portion of the drum. In FIGURES 6 and 7, the drum has passed through one fourth of its oscillating cycle and has rotated a half turn so that the filament has wound half way around the drum and has traversed out along the axial length of the drum toward its left end. In FIGURES 8 and 9, with the drum having moved through half its oscillating cycle and having rotated once, the filament has made a complete turn around the drum and has traversed back to the central portion. FIGURES 10 and 11 show the drum at three fourths of a cycle and one and a half rotations, and FIGURES 12 and 13 show the drum in the same position as FIGURES 4 and 5 at the completion of the cycle. The filament has made two complete turns around the drum and has traversed the axial length of the filament receiving portion of the drum circumference twice.

*Developed mat pattern at 2 to 1 ratio (FIG. 14)*

Figure 14:
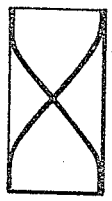
FIGURE 14 illustrates the general pattern that a single filament makes when wound as shown in FIGURES 4-13 and is then unwrapped from the drum and laid out in developed planar form.

If the filament wound on the drum as just described is cut at the two points where an axial line 54 of FIGURES 12 and 13 intersects it, and is then unwrapped with its underlying paper sheet and laid out in planar, developed form, the configuration of the filament will be generally as shown in FIGURE 14 with the line of axial cutting 54 corresponding to the top and bottom edges. The continuous unbroken filament making two complete turns around the drum before cutting becomes two separate filaments in the developed planar form of FIGURE 14 with the two separate filaments lying in crossing relation, and each tracing, in the developed plane, 180° of a generally elliptic sine curve which has a total amplitude equal to the distance along cutting line 54 between the two filaments.

It will be appreciated that if the drum continued to rotate and oscillate at the 2 to 1 ratio as described in connection with FIGURES 4–13, additional turns would be wound on top of the first two turns, and the final pattern would appear substantially as shown in FIGURE 14. It is not particularly desirable for present purposes that the pattern repeat itself in the sense of having all successive turns beginning adjacent one end of the drum overlie all preceding turns beginning from that end of the drum. Since this happens if the drum rotational speed is zero, or if it is an integral multiple of the oscillating speed, i.e., with ratios such as 1–1, 2–1, 3–1, etc., a ratio is established which includes a fraction.

*Developed mat pattern at 2¼ to 1 ratio (FIG. 15)*

Figure 15:
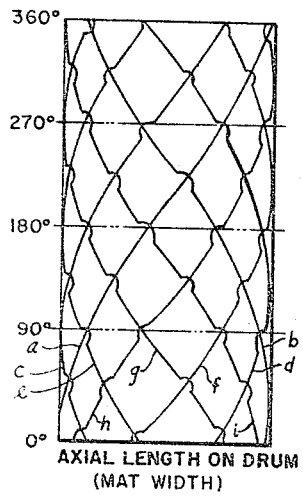
FIGURE 15 is a diagrammatic face view of the general pattern of a developed mat produced with a ratio of drum rotations to oscillations 2¼ to 1.

One such ratio which will be used herein as an example for pointing out certain features is 2¼ to 1 which yields a developed mat of the character diagrammatically shown in FIGURE 15. The enlargement of FIGURE 15 relative to FIGURE 14 is simply for clarity, although it is noted that there is usually an increase in the mat width (corresponding to axial length on the drum) with an increase in the ratio. As in FIGURE 14, the length of the mat in FIGURE 15 corresponds to the circumference of the drum, and the width corresponds to the axial length of the drum upon which the filaments are wound. An oscillating cycle will be considered as starting along the left edge of the mat which is divided into four parts, each of which corresponds to a quarter rotation of the drum and is correspondingly scaled in degrees. Successive alphabetical letters designate the successive turns of the filament upon the drum. The first turn, filament *a*, begins at the left edge at 0° and crosses diagonally toward the upper right but does not reach the right edge in one rotation of the drum. Filament *b* is the continuation of *a*, begins near the lower right corner, continues toward the right edge and coincides therewith at the level corresponding to 45°, and then continues diagonally up toward the upper left corner. Filament *c* is the turn successive to *b* and reaches the left edge at the 90° level, at which point the drum has completed 2¼ rotations and one oscillation. Filament *c* continues beyond the 90° level of course and passes diagonally up and toward the right, and the successive turns continue to fill out the pattern with filament *i* being the last turn of the pattern and terminating at the left edge at the 360° level. The 2¼ to 1 ratio pattern takes 4 oscillating cycles to complete, and it is noted that it includes 9 filaments which extend from one lateral or cut edge to the other, and has four crests (or four troughs depending upon one's view) along each longitudinal edge. If the operation were continued, a duplicating pattern would be wound over the first pattern. Thus, the pattern may be considered as a layer in the sense that it has the quality of completeness in returning to a starting point.

*Interlacing of filaments in a layer (FIG. 15)*

The filaments constituting a single layer illustrated in FIGURE 15 are interlaced with each other at their intersections as is schematically illustrated by the half loops of those filaments which overlie at the intersections. At any intersection between a successive turn with a preceding turn, the successive turn will overlie the preceding turn. Thus considering the filament designated $e$ for example, and following its path upwardly from the 0° level, it underlies filaments $f$ and $h$, then overlies filaments $a$ and $c$, then underlies filaments $g$ and $i$, and then overlies filaments $b$ and $d$. This interlacing of the filaments gives a layer a woven character which greatly enhances the integrity of the mat in the direction of depth.

For convenience in description, the filaments forming the lattice-like pattern of FIGURE 15 may be characterized as weft and warp filaments. Those filaments and portions of filaments which extend diagonally upward from left to right are termed warp filaments while those which extend upwardly from right to left are termed weft filaments. At slightly under one half of the intersections warp filaments overlie weft filaments, while at the other intersections weft filaments overlie warp filaments. The reason the numbers are not equally divided is that in one complete layer one or more turns (depending upon the ratio) must underlie all other intersecting turns, and one turn or more turns in the opposite direction must overlie all other intersecting turns. Thus a condition of exactly half of the intersections being formed with warp filaments overlying weft filaments and the other half being formed with weft filaments overlying warp filaments will not be achieved in a complete pattern. The slight deviation from an equally divided distribution between crossings of the one character and the other does not significantly detract from the quality of the mat, and it is further noted that the great number of turns made in forming a mat results in closely approaching the equal division.

*The nature of the path which the filaments trace*

The path which the filaments, or portions of the filaments, trace in the plane of the layer when the mat is laid out in developed form is generally that of an elliptic sine curve having a total amplitude from crest to trough equal to the width of the mat. Such a sine curve, as compared to a circular sine curve, may be said to have somewhat flattened crests and troughs and with the lines joining crests and troughs, being somewhat straighter. This property is considered advantageous in the developed mat since a larger area of the mat in the direction of width is usable due to greater uniformity in the angles between the crossing filaments along a line across the mat between the longitudinal edge areas. For most purposes, the edge areas (corresponding to the crests and troughs) are trimmed off and disposed of separately from the central portion.

The manner in which the generally elliptic sine curve paths are traced by the filaments will be briefly considered in connection with FIGURES 4 and 6. First it is noted that the length of filament wound on a surface during a given time period is a function of the surface speed. Due to the movement of the drum in an oscillating path and its simultaneous rotation on its axis, the surface speed of the drum surface upon which the filament is being deposited will vary along the axial length of the drum. Thus, when the filament is tangent to a point on that part of the drum surface which lies in the plane perpendicular to the drum axis and passing through the center of the drum (FIGURE 4), the surface speed is at a minimum relative to the filament, and it is believed that at this instant it is only the rotational speed of the drum which influences the length of filament wound. However, as the turn traverses toward the end of the drum (FIGURE 6) the speed of the surface includes a velocity component due to oscillation as well as a velocity component due to rotation. As presently perceived, it is this relation which results in the generally elliptic sine curve path of the filaments in the developed mat.

*Ratios*

As examples for explanation, the ratios of 2 to 1 and 2¼ to 1 have been used. Such ratios result in the pattern repeating itself in successive layers containing only a relatively small number of filaments, such as the 9 turns of FIGURE 15. For presently preferred commercial mats, it is desirable that the filaments be rather closely spaced to give substantially uniform coverage of the entire mat area. Consequently the ratios are set at a figure which requires many more than nine turns to lay one complete layer. In that connection it is noted that if the integer and fraction corresponding to drum rotation is converted to an improper fraction (e.g., 9/4 in the case of the 2¼ to 1 ratio), the numerator of that improper fraction equals the number of turns required to make a complete pattern, and the denominator equals the number of crests that the pattern will have along any one longitudinal edge of the developed layer. This relationship also applies if the drum speed is an integral multiple of the oscillating speed such as 2 to 1, in which case, as shown in FIGURE 14, there are two filaments in a pattern and one crest along each longitudinal edge. Thus, if a ratio of, say 1¹/₃₆₀ to 1 is used, there will be 361 filaments in the pattern, and each successive crest along a longitudinal edge of the mat will be spaced the equivalent of 1° from the preceding crest so that there will be 360 crests along each longitudinal edge. The crests most nearly directly opposite from each other across the mat will be offset by ½°. In this example, each successive filament may be said to be out of phase with the preceding filament by 1° since the crest of each successive filament is shifted along the longitudinal edge by 1° from the preceding filament crest, and successive layers composed of complete patterns after 360 oscillations may be said to be in phase with each other.

Figure 16:
FIGURES 16-18 illustrates the general patterns of filaments in developed mats produced with ratios of 1 to 1, 3 to 1, and 4 to 1, respectively.
Figure 17:
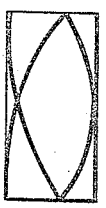
Figure 18:
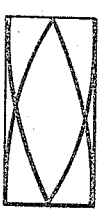

If in FIGURE 14 the trace of the filament extending for the length of the mat between cut edges is compared to a graph of a sine function in rectangular coordinates, it will be seen that each filament wound at a 2 to 1 ratio embraces an angle corresponding to 180° of a sine wave. At a 1 to 1 ratio (i.e., when the drum is driven through its oscillating path but is not independently rotated upon its longitudinal axis) a filament extending from one cut edge to the other corresponds to 360° of a sine wave. The same relationship obtains with other speed ratios so that with a 3 to 1 ratio, each filament corresponds to 120°, and at a 4 to 1 ratio each filament corresponds to 90°. The total amplitude is of course equal to the width of the mat, and in the case of ratios above 2 to 1, a single filament can not trace a path embracing the total amplitude of the wave. FIGURES 16, 17 and 18 generally illustrate the patterns formed in a planar mat during a single oscillation of the drum at ratios of 1 to 1, 3 to 1, and 4 to 1, respectively.

A change in the ratio also results in a change in the angles at which filaments cross. Thus, with other things remaining equal, an increase in the ratio causes an increase in the included angles which open toward longitudinal edges of the mat. An increase in ratio will also, within limits, cause an increase in width of the mat.

*Other factors affecting the pattern*

In addition to the ratio factor, there are several other factors which affect the pattern. An increase in the diameter of the drum will increase both the length and the width of the planar mat. Increasing the distance between the oscillating axis 4 and the furnace 10, or increasing the angle between the oscillating axis and drum axis, will increase the width of the mat. It will be appreciated that changes in such factors are usually limited by other factors. Thus, if the furnace is spaced too far from the drum with ratios above certain values, the filaments will wind off the end of the drum. Conversely, a closely spaced furnace will limit the width of the pattern to a certain value for all practical purposes regardless of increases in the speed ratio. In predetermining the effect of changing various factors, it is noted that while certain of the relationships may be expressed in equation form, such equations are, for the most part, of considerable complexity due to the compound motions involved, and thus there is considerable merit in establishing the relationship between factors, in part at least, from operating experience.

As presently contemplated, mats produced with the drum axis at an angle relative to the axis of oscillation of about 45° are satisfactory for their intended purpose. Increasing the angle is desirable in certain respects, such as increasing both the amplitude of the generally elliptic sine curve paths of the filaments and their slope throughout the central part of the mat relative to a longitudinal edge, but it must be kept in mind that this also increases the size of the circle which the drum ends trace. This may require elevating the furnace relative to the drum to minimize fiber breakout at the furnace orifices, and this elevation in turn tends to further increase the width of the mat. Also the problems experienced with the mechanics of the apparatus may be expected to generally increase with increased angles between drum axis and oscillation axis. In brief then, the inter-relationship of the various factors involved must be well considered in connection with the practical operation of the apparatus.

While only a limited number of mat examples have been described, and a presently contemplated mode of operation set forth, it will be appreciated that various departures in detail from what has herein been set forth may be employed without departing from the principles of the invention. As examples of such departures which are considered to be within the scope of the invention, shifting of the furnace, or any other means from which one or more filaments may be fed, back and forth generally along or at an angle to the axis of oscillation, and/or elevating it, during the winding process, may be employed. Further, the element upon which the filaments are wound need not be in form of a right cylinder (although for mechanical reason it is preferable that it be symmetrical about its longitudinal axis), and it need not be supported at both ends.

It is further noted that in accordance with the invention, continuous strands of glass filaments may be wound into a package upon a rotating element in a path rapidly traversing back and forth along the length of the rotating element without any requirement of a guide to effect the rapid traversing. By virtue of the absence of any guide means, any abrading of the glass filaments in contacting the guide is avoided, and hence there is no necessity for coating the filaments to minimize abrasion as is usually the case when a guide is used.

I claim:

1. The method of making a portion of a filamentous mat comprising:
   (a) rotating a cylinder about its longitudinal axis;
   (b) feeding filaments from filament feeding means to said rotating cylinder;
   (c) collecting all of said filaments on a circumferential surface of said cylinder between the ends thereof;
   (d) rotating the ends of said cylinder about a second axis so the longitudinal axis of said cylinder generates opposite right cones of selected equal apex angles on opposite sides of the mid-point of said cylinder so the speed, relative to said feeder means, of the incremental portions of said cylindrical surface receiving said filaments from said feeder is comparatively constant whereby a cylindrical filamentous mat is formed on said cylinder wherein the width of said mat is determined by said angles and the spacing between adjacent filaments laid on said surface is determined by the relative speed of rotation of said drum about said first axis and the speed of rotation of said ends around said second axis; and,
   (e) removing said cylindrical, filamentous mat as a whole in sheet form from said cylinder.

2. The method of making a portion of a filamentous mat comprising:
   (a) rotating a cylinder about its longitudinal axis;
   (b) feeding filaments from filament feeding means to the circumferential surface of said cylinder from filament feeding means disposed to feed filaments to said circumferential surface between the ends of said cylinder;
   (c) winding all of said filaments upon said circumferential surface of said rotating cylinder;
   (d) revolving the ends of said cylinder about an axis intersecting the midpoint of the longitudinal axis of said cylinder at a selected acute angle so said acute angle determines the width of the cylindrical open end filamentous mat formed upon said circumferential surface and the speed, relative to said feeder means, of the incremental portions of said surface receiving said filaments from said feeder is constant when receiving said filaments and the spacing between adjacent filaments laid on said drum is determined by the relative speed of rotation of said drum about the first axis and said ends about said second axis; and,
   (e) removing said cylindrical, filamentous mat as a planar mat.

3. A method of claim 2 including positioning said cylinder so said longitudinal axis intersects said second axis at an angle of about 45 degrees and said drum makes about 360 revolutions about said longitudinal axis for every rotation of said ends about said second axis.

4. The method of making a filamentous mat comprising:
   (a) rotating a cylinder, having a substantially symmetrical circumferential surface relative to its longitudinal axis, upon its axis;
   (b) rotating the ends of said cylinder in a manner that opposite end portions of said cylinder orbit in circles about a second axis intersecting the midpoint of said longitudinal axis at a selected acute angle;
   (c) drawing filaments to said cylinder from a molten material supply furnace disposed between the ends of said cylinder;
   (d) winding said filaments only on said circumferential surfaces of said cylinder so the speed, relative to said feeder means, of incremental portions of said surface receiving said filaments from said feeder is constant at the time said filaments are received on said portion and so the spacing between adjacent filaments wound on said cylinder is determined by the speed of rotation of said cylinder about said longitudinal axis relative to the speed of rotation of said ends of said cylinder about said second axis; and,
   (e) removing said hollow, open-end, filamentous mat as a planar mat.

5. The method of making a portion of a planar, filamentous mat comprising:
   (a) feeding all of the filaments from a molten material supply to the circumferential surface of a cylinder;
   (b) rotating said cylinder about its longitudinal axis;
   (c) simultaneously rotating the opposite ends of said cylinder about a second axis, which axis intersects said longitudinal axis at a selected acute angle at the center of said cylinder so the linear speed of attenuation of said filaments from said feeder is constant, the spacing between adjacent filaments wound on said cylinder in accordance with the speed of rotation of said cylinder about said longitudinal axis relative to the speed of rotation of said cylinder about said second axis and so the width of said mat formed on said cylinder is determined by said angle;

(d) controlling the ratio of rotations of said cylinder about said longitudinal axis to rotations of said ends about said second axis to equal a value relatively close to unity whereby each successive turn of filaments lies closely adjacent to a preceding turn of filaments;

(e) cutting the filaments forming the open-end, cylindrical mat built up on said circumferential surface; and (f) removing said mat as a planar mat from said cylinder.

6. A method of making a portion of a glass fiber filamentous mat comprising:

(a) melting glass in an orificed furnace located above a cylinder to feed filaments to the circumferential surface of said cylinder between the ends of said cylinder;

(b) rotating said cylinder upon its lonigtudinal axis;

(c) rotating the ends of said cylinder in a rotary fashion about a second axis, which axis intersects said longitudinal axis at selected angle at the midpoint of said cylinder;

(d) winding filaments issuing from said furnace only upon the circumferential surface of said cylinder so the linear speed of attenuation of said filaments from said feeder is constant and so the spacing between adjacent filaments wound on said cylinder is determined by the speed of rotation of said cylinder on its longitudinal axis relative to the speed of rotation of said ends about said second axis;

(e) slitting the so built-up cylindrical mat along an axial line; and (f) removing said mat from said cylinder as a planar mat.

References Cited by the Examiner

UNITED STATES PATENTS

| | | | |
|---|---|---|---|
| 2,164,145 | 6/1939 | Pluckrose | 242—2 |
| 2,613,039 | 10/1952 | Holcomb | 242—18 |
| 2,705,692 | 4/1955 | Petterson | 161—59 |
| 2,798,531 | 7/1957 | Jackson | 242—158 |
| 3,072,513 | 1/1963 | Schlarb | 161—59 |
| 3,104,839 | 9/1963 | Krupp et al. | 242—2 |
| 3,115,312 | 12/1963 | Rees | 242—18 |
| 3,140,058 | 7/1964 | Courtney | 242—2 |

DONALL H. SYLVESTER, *Primary Examiner.*

EARL M. BERGERT, R. J. CARLSON, R. L. LINDSAY, *Assistant Examiners.*